United States Patent
Hisamatsu et al.

(10) Patent No.: US 7,138,183 B2
(45) Date of Patent: Nov. 21, 2006

(54) ENVIRONMENTAL BARRIER COATING MATERIAL AND COATING STRUCTURE AND CERAMIC STRUCTURE USING THE SAME

(75) Inventors: Tooru Hisamatsu, Kanagawa (JP); Isao Yuri, Kanagawa (JP); Shunkichi Ueno, Aichi (JP); Tatsuki Ohji, Aichi (JP); Syuzo Kanzaki, Aichi (JP)

(73) Assignees: Central Research Institute of Electric Power Industry, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 11/034,140

(22) Filed: Jan. 12, 2005

(65) Prior Publication Data

US 2005/0249977 A1    Nov. 10, 2005

(30) Foreign Application Priority Data

Jan. 13, 2004    (JP)    ............................. 2004-005216

(51) Int. Cl.
    *B32B 9/04* (2006.01)
(52) U.S. Cl. ...................... 428/446; 428/688; 428/689; 428/701; 428/702; 216/241 R; 216/241 B
(58) Field of Classification Search ............. 416/241 B
    See application file for complete search history.

(56) References Cited

U.S. PATENT DOCUMENTS 3,634,113 A * 1/1972 Fehrenbacher ............... 501/103
6,759,151 B1 * 7/2004 Lee ............................ 428/701
6,812,176 B1 * 11/2004 Zhu et al. ................... 501/102
7,001,859 B1 * 2/2006 Zhu et al. ................... 501/102

FOREIGN PATENT DOCUMENTS

| JP | 5-208870 A | 8/1993 |
|---|---|---|
| JP | 5-221728 A | 8/1993 |
| JP | 6-32658 A | 2/1994 |
| JP | 10-87364 A | 4/1998 |
| JP | 10-87386 A | 4/1998 |
| JP | 11-12050 A | 1/1999 |
| JP | 11-139883 A | 5/1999 |

* cited by examiner

*Primary Examiner*—Jennifer C. McNeil
*Assistant Examiner*—Elizabeth D. Ivey
(74) *Attorney, Agent, or Firm*—Notaro & Michalos P.C.

(57) ABSTRACT

An environmental barrier coating material comprising one or more constituents selected from a group consisting of hafnia; hafnia stabilized by one or more rare-earth oxides and/or silica; zirconia-containing hafnia; and zirconia-containing hafnia stabilized by one or more rare-earth oxides and/or silica, which when formed as a coating structure for covering a substrate which has a low thermal expansion coefficient, has hafnon ($HfSiO_4$) serving as a first layer directly formed on the substrate, and hafnia with which the first layer is coated as a second layer.

19 Claims, 6 Drawing Sheets

Deposition method for the first layer

Deposition method for the second layer

ENVIRONMENTAL BARRIER COATING MATERIAL AND COATING STRUCTURE AND CERAMIC STRUCTURE USING THE SAME

TECHNICAL FIELD

The present invention relates to an environmental barrier coating material, as well as a coating structure and a ceramic structure to which the coating material is applied, suitable for use in a harsh environment in which exposure to a high-temperature and high-velocity combustion gas flow containing water vapor occurs. Further, the present invention relates, specifically, to an environmental barrier coating material, as well as a coating structure and a ceramic structure to which the coating material is applied, which suppresses corrosion and erosion under the high-temperature and high-pressure conditions of a gas turbine component in an environment in which a corrosive gases are present.

BACKGROUND OF THE INVENTION

Silicon nitride ceramics and silicon carbide ceramics are easily oxidized at high temperatures and eroded in an environment, in which water vapor is present, as a result of corrosion. There is, therefore, a need to protect erosion when non-oxide ceramics are applied as a gas turbine component, requiring the application onto the surface of a water vapor corrosion resistant layer for that purpose.

A mechanism for improving oxidation resistance has been proposed for silicon nitride ceramics having excellent oxidation resistance in high temperatures, as disclosed in, for example, Japanese Patent Laid-Open No. 6-32658, Japanese Patent Laid-Open No. 5-221728 and Japanese Patent Laid-Open No. 5-208870, in which a rare-earth oxide is added as a sintering aid and the resulting compound is formed on the surface.

Lutetium disilicate ($Lu_2Si_2O_7$) has a relatively low thermal expansion coefficient, and it is known that this material can remain on a non-oxide ceramics surface even after testing in an actual gas turbine environment. This material has begun to be broadly researched as a candidate material for an environmental barrier coating for non-oxide ceramics.

Regarding non-oxide ceramic structures having a rare-earth oxide silica coating deposited, a rare-earth silicate deposited silicon nitride ceramic structure, with the rare-earth with respect to Y, Yb, Er and Dy, is known as disclosed in, for example, Japanese Patent Laid-Open No. 11-139883, Japanese Patent Laid-Open No. 11-12050, Japanese Patent Laid-Open No. 10-87386, and Japanese Patent Laid-Open No. 10-87364. It is also well known that water vapor corrosion can be effectively suppressed in a static environment when the rare-earth is Lu by depositing lutetium silicate on a silicon nitride ceramics.

SUMMARY OF THE INVENTION

However, at an actual gas turbine combustion field, water vapor generated from the combustion of fossil fuels exists, and the field is subjected to a high-temperature and high-velocity air flow. Therefore, an environmental barrier coating must be a material which effectively suppresses erosion in such a harsh environment. To put into practical use as a gas turbine component, the erosion in an environment equivalent to that of an actual gas turbine is required to be not more than several hundred microns over 10,000 hours. However, a material showing such excellent environmental-resistance is yet to be found.

The erosion mechanism of a material in a high-temperature and high-velocity air flow in the presence of water vapor can be expressed in accordance with an Arrhenius equation as a function of the pressure, water vapor pressure and velocity of the air flow. Accordingly, a large number of parameters need to be taken into consideration for the physical properties required for an environmental barrier coating candidate material, such as (1) high melting point; (2) suppression of high-temperature chemical reaction; and (3) small water vapor pressure of the generated chemical species in cases where high-temperature chemical reaction does occur. However, the fact is that at present using only the test results from a water vapor corrosion test, the physical properties for an excellent environmental barrier coating material cannot be correctly evaluated.

In view of this, it is an object of the present invention to provide an environmental barrier coating material, as well as a coating structure and a ceramic structure to which the coating material is applied, which can suppress erosion over a long period of time even in a harsh environment with exposure to a high-temperature high-velocity gas flow containing water vapor. It is another object of the present invention to provide a feasible environmental barrier coating structure that is an effective environmental barrier coating for a substrate having a low thermal expansion coefficient, such as a ceramics. It is still another object of the present invention to provide an environmental barrier coating structure and a ceramic structure which can constitute a corrosion-resistant layer that can effectively suppress the progress into the substrate of a crack resulting from stress between the coating and the substrate.

Specifically, it is an object of the present invention to provide an environmental barrier coating material, as well as a coating structure and a ceramic structure in which the coating material is applied, which enables the fabrication of a structure, such as a gas turbine component or the like, having an environmental barrier coating that can suppress corrosion and erosion even in an environment with exposure to a high-temperature high-velocity gas flow containing water vapor at a high temperature of about 1300° C. or more.

In such circumstances and in view of the above-described conventional art, the present inventors have discovered an environmental barrier coating material which allows the various problems in the above-described conventional art to be fundamentally resolved. As a result of intensive research having as its objective the production of ceramics possessing an environmental barrier coating, the inventors discovered that hafnia, hafnia containing zirconia, and partially stabilized hafnia containing zirconia can suppress erosion over a long period of time even in an environment equivalent to that in an actual gas turbine conditions, that is, an environment exposed to a high-temperature high-velocity gas flow containing water vapor. In addition, the present inventors have also discovered that it is possible to fabricate ceramics having an environmental barrier coating that can suppress erosion even in an environment equivalent to that of an actual gas turbine conditions at a high temperature of about 1300° C. or more.

That is, the environmental barrier coating material according to the present invention comprises one or more constituents selected from a group consisting of hafnia; hafnia stabilized by one or more rare-earth oxides and/or silica; zirconia-containing hafnia; and zirconia-containing hafnia stabilized by one or more rare-earth oxides and/or silica. Here, it is sufficient for the environmental barrier coating material according to the present invention to be present on just a top-coat layer portion of the coating.

Further, the environmental barrier coating structure according to the present invention is a structure in which hafnon (HfSiO$_4$) is directly formed as a first layer onto a substrate having a low thermal expansion coefficient and hafnia is directly deposited thereon as a second layer.

Here, the hafnia of the second layer in the environmental barrier coating structure may be such that it does not contain impurities, although the hafnia may also comprise impurities which are inevitably included during the production process or contain a constituent that has been added intentionally. For example, a structure wherein zirconia (ZrO$_2$) is comprised as impurities or zirconia has been intentionally added (excluding 100%) is preferable in terms of ease with which raw materials can be obtained and production costs. The zirconia content in the portion toward the coating surface is preferably higher than that in the potion toward the first layer.

The above-described hafnia in the environmental barrier coating structure is preferably stabilized, and more preferably is stabilized by one or more constituents selected from a group consisting of rare-earth oxides and silica. In such a case, the silica constituent contained in the second layer is preferably less in the portion near the coating surface than in the portion near the first layer, and more preferably is a gradient composition in which the ratio decreases toward the coating surface; a state in which the silica component is completely absent or sparingly contained in the top-coat portion forming the surface; or formed only from hafnia stabilized by one or more rare-earth oxides or from zirconia containing hafnia. In a coating composition such as this, the thermal expansion coefficient mismatch with the first layer is lower. In addition, when the second layer is formed from hafnia which contains zirconia and is stabilized by one or more rare-earth oxides and/or silica, the silica component is preferably graded so that it gradually decreases from the first layer toward the coating surface. In addition, the portion closest to the first layer is preferably formed from hafnia stabilized by only silica, while the coating surface portion is preferably formed from hafnia stabilized by only one or more rare-earth oxides.

While the first layer may be formed from hafnon that does not contain any impurities, it may also be formed from hafnon which comprises impurities which are inevitably included during the production process or contain a constituent that has been added intentionally. For example, the first layer may be formed from hafnon (HfSiO$_4$) as a main constituent and a hafnia-silica oxide comprising at least one of hafnia (HfO$_2$), zirconia (ZrO$_2$) or silica (SiO$_2$). Even such a case maintains the effects of alleviating the stress between the substrate and the environmental barrier coating, which consists of hafnia or has hafnia as a main constituent and which serves as a corrosion-resistant layer covering the substrate, as well as maintaining the effects of resolving the various problems relating to the stress stemming from the thermal expansion coefficient mismatch between the substrate and the intermediate layer itself.

The environmental barrier coating materials according to the present invention can suppress erosion over a long period of time and does not corrode even in a high-temperature high-velocity gas flow in an environment in which water vapor is present. It can therefore be used as the corrosion protection material of a coating for a substrate made from any type of material. In particular, the present coating material can be used as the top-coat for a gas turbine blade or the like which is employed in a harsh environment in a high-temperature region.

Since hafnon, which has a melting point of about 1680° C., is used as an intermediate layer between the substrate and the top-coat, which makes up the second layer, the environmental barrier coating structure according to the present invention can effectively suppress progress into the substrate of a crack resulting from stress between the coating and the substrate, through the softening of hafnon in a high temperature region of about 1300° C. or more. Therefore, when the above-described environmental barrier coating material is formed as a coating onto a substrate having a low thermal expansion coefficient, the stress resulting from thermal expansion coefficient mismatch between the coating and the substrate is alleviated. This improves its reliability as a structural member (substrate) relating to high-temperature properties, whereby erosion can be suppressed over a long period of time. Thus, even in a high-temperature environment of about 1300° C. or more, such as that of a gas turbine combustion location in particular, cracks do not occur in the second layer, i.e. corrosion-resistant layer, whereby a corrosion-resistant layer can be provided which is stable over a prolonged period of time.

When a ceramic structure uses the environmental barrier coating material and coating structure according to the present invention for coating a substrate made from silicon nitride ceramics or silicon carbide ceramics, the thermal expansion coefficient of the first layer hafnon which is directly deposited on the substrate is 3.6×10$^{-6}$, which is close to the thermal expansion coefficient of silicon nitride ceramics and/or silicon carbide ceramics that have a low thermal expansion coefficient, whereby the various problems relating to the stress stemming from a thermal expansion coefficient mismatch between the substrate and the intermediate layer itself can be eliminated.

BRIEF DESCRIPTION OF THE DRAWINGS

FIGS. 5A and 5B are a diagram illustrating the external appearance of a sample consisting of a mixture of non-stabilized hafnia and zirconia both before and after undergoing a corrosion test, wherein FIG. 5A is before the test and FIG. 5B is after the test.

DETAILED DESCRIPTION OF THE INVENTION

Figure 1:
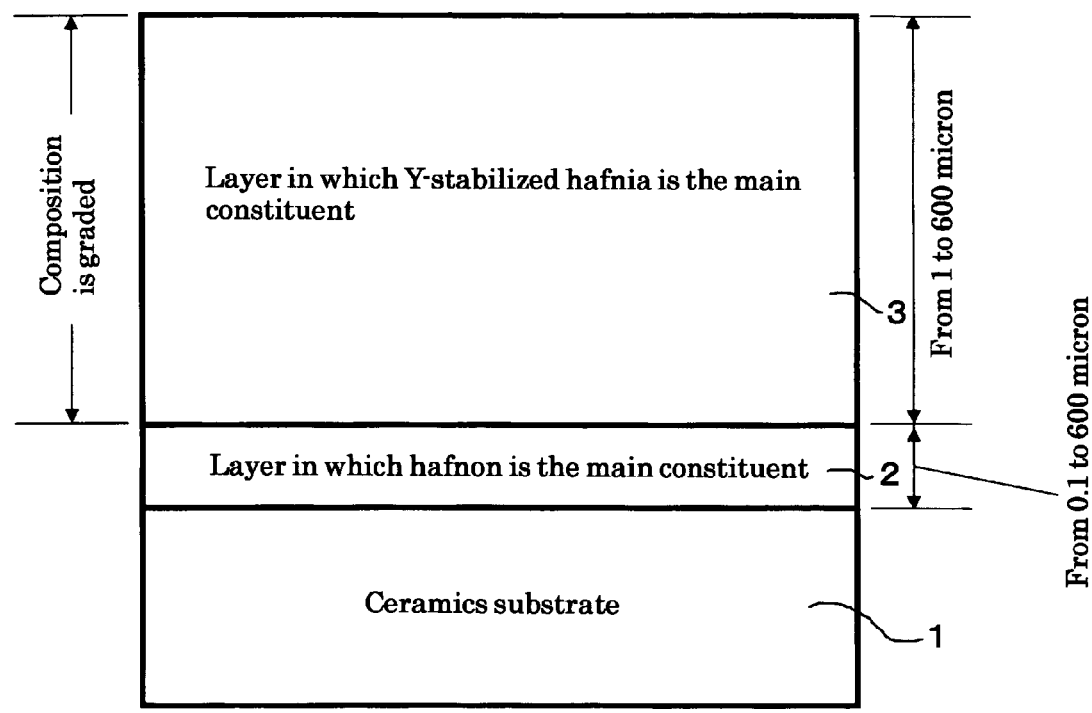
FIG. 1 shows a cross-sectional view of the environmental barrier coating according to the present invention.

The structure of the present invention will now be explained in detail based on a best mode illustrated in the drawings.

The environmental barrier coating material according to the present invention comprises as a main constituent at least one of hafnia; hafnia stabilized by one or more rare-earth oxides and/or silica; and zirconia-containing hafnia stabilized by one or more rare-earth oxides and/or silica. When the coating consists of a plurality of layers, it is sufficient for the environmental barrier coating material according to the present invention to be contained in just the top-coat layer portion of the coating as a main constituent comprising at least one of hafnia; hafnia stabilized by one or more rare-earth oxides and/or silica; and zirconia-containing hafnia stabilized by one or more rare-earth oxides and/or silica.

Here, although the environmental barrier coating material may be formed from 100% hafnia that essentially does not contain any impurities, it may also contain impurities which are inevitably included during the production process or contain a constituent that has been added intentionally. Commercially-available hafnia invariably has a small amount of zirconia mixed therein, so that even for a purity of 99.99%, for example, if broken down this usually works out to be hafnia 98% and zirconia 1.9%. For hafnia in which the purity is poor, there are cases where roughly about 2% zirconia is contained as impurities. Since hafnium and zirconium belong to the same group in the periodic table, their nature is extremely similar, thus making it difficult to completely separate them from each other, whereby hafnia inevitably contains a slight amount of zirconia as impurities. However, zirconia and hafnia have exactly the same nature and zirconia itself possesses excellent environmental resistance. Accordingly, no dramatic deterioration in environmental resistance, such as erosion resistance, is caused, and to the contrary is preferable from the point that a stable supply of raw materials can be ensured. Therefore, as long as the zirconia content does not reach 100%, more than the above-described amount may be intentionally added. In some cases the zirconia content can be made to gradually increase heading toward the coating surface side, or deposited in a plurality of layers in which the zirconia content is higher on the top layer side (coating surface side) than the bottom layer side. In such cases the nature of hafnia and zirconia is still exactly the same, meaning that since zirconia itself possesses excellent environmental resistance, no dramatic deterioration in environmental resistance, such as erosion resistance, is caused, and to the contrary is preferable from the point that a stable supply of raw materials can be ensured.

The hafnia is preferably stabilized by one or more constituents selected from the group consisting of rare-earth oxides and silica. In particular, because zirconia-containing hafnia is subjected to phase transformation in the vicinity of 1000° C. due to the volumetric expansion of the zirconia, it is necessary to stabilize using a stabilizer such as silica and/or rare-earth oxides. If either or both of silica and rare-earth oxides are added as stabilizer, the high temperature phase (1000° C.) of hafnia can be stabilized until room temperature, thereby suppressing the development of cracks caused by volumetric expansion. The amount added of this silica and/or rare-earth oxides are effective at 3% or more, and can be selected as appropriate within the range in which it becomes a solid-solution in hafnia. For example, when a rare-earth oxide is used as the stabilizer, the mole ratio $AO_2$ (A representing hafnia):$Ln_2O_3$ (Ln representing a rare-earth) with respect to hafnia is in the range from about 97:3 to 50:50; preferably from 95:5 to 50:50; and more preferably from 90:10 to 50:50. When hafnia is stabilized by one or more rare-earth oxides and silica, the mole ratio $AO_2$:$Ln_2O_3$ and $SiO_2$ is in the range from about 9:1 to 6:4; preferably from 8:2 to 6:4; and more preferably from 7:3 to 6:4. The rare-earth oxide is preferably one or more of the oxides selected from the group consisting of $Y_2O_3$, $La_2O_3$, $Nd_2O_3$, $Sm_2O_3$, $Gd_2O_3$, $Dy_2O_3$, $Ho_2O_3$, $Er_2O_3$, $Yb_2O_3$ and $Lu_2O_3$. While the stabilizer that is usually used is $Y_2O_3$, including other rare-earth oxides, all rare-earth oxides can be a solid-solution in the hafnia for achieving stabilization.

Adding one or more of the constituents selected from the group consisting of rare-earth oxides and silica stabilizes the hafnia in a high-temperature stabilized phase of a cubic system or a tetragonal system by the rare-earth oxide and/or silica. The corrosion-resistant layer achieved by this comprises stabilized hafnia as a main constituent, and can also comprise a small amount of one or more of $SiO_2$, $Ln_2Si_2O_7$, $Ln_2SiO_5$, $HfSiO_4$ and $ZrSiO_4$ phase as a subphase depending on the type of hafnia stabilizer or the like added in response to coating non-uniformity. For example, when the hafnia contains zirconia as impurities, $ZrSiO_4$ phase is manifested as a subphase, whereas for pure hafnia that does not contain zirconia as impurities, ($HfSiO_4$) is manifested as a subphase. However, the manifestation of these subphases does not impair performance as an environmental barrier coating material, namely the corrosion-resistance and erosion-resistance against the high-temperature and high-velocity corrosive gases. Here, at the top-coat portion directly exposed to high-temperature and high-velocity corrosive gases, the silica constituent is blown by a high-temperature and high-velocity corrosive gas flow, whereby there is a risk of the corrosion-resistance and erosion-resistance deteriorating. Therefore, it is preferable to use at the top-coat portion directly exposed to high-temperature and high-velocity corrosive gas zirconia-containing hafnia that is stabilized by one or more rare-earth oxides and that does not contain silica or hafnia that does not contain any impurities.

The thickness for the environmental barrier coating materials used as this invention must be at least about 1 µm, and more preferably as thick as possible. For example, the thickness when forming the coating from stabilized hafnia may be selected in the range from 1 µm to 600 µm, more preferably from 100 µm to 500 µm, and even more preferably from 100 µm to 300 µm.

This environmental barrier coating material is not corroded and can suppress erosion over a long period of time even in a high-temperature high-velocity gas flow in an environment in which water vapor is present. It can, therefore, be used as the corrosion-resistant material of a coating for a substrate made from any material, and is in particular suitable for use as a top-coat for a gas turbine blade or the like used in a harsh environment in a high-temperature region.

On the other hand, because it is desirable to use a material which has a low thermal expansion coefficient for the structural material employed at a gas turbine combustion location in consideration of thermal shock capabilities, the development of silicon based non-oxide ceramics such as silicon nitride or silicon carbide has been progressing. However, when depositing a stabilized hafnia having a high thermal expansion coefficient on a substrate having a low thermal expansion coefficient of such a type, a large stress stemming from the thermal expansion coefficient mismatch is placed on the coating, wherein there is the risk of cracks forming. The formation of such cracks can affect on the oxidation of the substrate, giving cause for concern of substrate damage.

The present invention aims to alleviate this stress by interposing as an intermediate layer hafnon, or a hafnia-silica oxides layer having hafnon as a main constituent, between the substrate and the environmental barrier coating which covers the substrate and which consists of hafnia or has a main constituent of hafnia as a corrosion-resistant layer. That is, the environmental barrier coating structure according to the present invention covering a substrate which has a low thermal expansion coefficient is a structure in which hafnon (HfSiO$_4$) serves as a first layer and the first layer is coated with hafnia as a second layer. Since the melting point of hafnon is 1680° C., in an environment equivalent to an actual gas turbine conditions, i.e. a temperature of about 1300° C., alleviation of the stress between the coating and the substrate can be achieved by softening to act as a buffering material. Further, the thermal expansion coefficient of hafnon is $3.6\times10^{-6}$, which is close to the thermal expansion coefficient of silicon nitride ceramics and silicon carbide ceramics having a low thermal expansion coefficient, whereby the various problems relating to the stress stemming from the thermal expansion coefficient mismatch between the substrate and the intermediate layer can be eliminated.

The first layer, which serves as the intermediate layer, may be formed from 100% hafnon, although it may also be formed from a material containing impurities which are inevitably included during the production process or a constituent that has been added intentionally. For example, when hafnon is deposited directly onto a substrate consisting of a silicon based non-oxide ceramics, the silica from the substrate side diffuses into the hafnia which was deposited to obtain zirconia-containing hafnon, thereby comprising a hafnia-silica oxide that consists of any one of hafnia, silica-stabilized hafnia, hafnon and silica, or a mixture thereof. That is, the first layer may consist of hafnon (HfSiO$_4$) as a main constituent and a hafnia-silica oxide comprising at least one of hafnia (HfO$_2$), zirconia (ZrO$_2$), or silica (SiO$_2$). Even such a case maintains the effects of alleviating the stress between the substrate and the environmental barrier coating which serves as a corrosion-resistant layer covering the substrate and which consists of hafnia or has a main constituent of hafnia, and also eliminating the various problems relating to the stress stemming from thermal expansion coefficient mismatch between the substrate and the intermediate layer itself.

The composition ratio of silica with respect to hafnia can be selected as appropriate from the solid-solution range of silica with respect to hafnia, and can be, for example, a ratio as defined by atomic ratio in the range from about 3:7 to 7:3; preferably from 4:6 to 7:3; and more preferably from 5:5 to 7:3. Although the thickness of the first layer is not particularly restricted, it is at least about 0.1 μm or more, and up until about 600 μm there are no production difficulties. In particular, increasing the thickness of the heat-resistant coating for a gas turbine (generally referred to as "TBC") is desirable in terms of maintaining over a long period of time (10,000 hours or more) in an environment exposed to a high-velocity gas flow which contains water vapor at very high-temperature. Preferable is a thickness exceeding about 300 μm, and more preferable is a thickness about 600 μm that is not subject to any production difficulties.

As mentioned in the explanation of the environmental barrier coating material, although the second layer which consists of hafnia may be formed from 100% hafnia that essentially does not contain any impurities, it may also contain impurities which are inevitably included during the production process or a constituent that has been added intentionally. For example, a layer comprising zirconia (ZrO$_2$) as impurities, or further a layer in which zirconia has been intentionally added (excluding 100%) is preferable from in terms of the ease with which raw materials can be obtained and production costs. Commercially-available hafnia invariably contains zirconia as impurities, so that it is preferable to stabilize it as a high-temperature stabilized phase of a cubic system or a tetragonal system by one or more constituents selected from the group consisting of rare-earth oxides and silica. Especially when used as a coating for improving erosion-resistance of a ceramic substrate which contains silicon as the substrate, such as silicon nitride or silicon carbide, even if the substrate oxidizes to form silica, such silica is preferably absorbed to form stabilized hafnon or zircon. It is therefore preferable to use silica as a stabilizer at the portion in proximity to the substrate.

Here, the silica in the high-temperature and high-velocity combustion gas flow is vaporized by water vapor, thereby increasing recession velocity. This in turn causes the silica constituent to be blown away by the high-temperature and high-velocity corrosive gas flow at least at the top-coat portion directly exposed to the high-temperature and high-velocity corrosive gas, whereby there is a risk that corrosion-resistance and erosion-resistance may deteriorate. Therefore, at least at the top-coat portion directly exposed to the high-temperature and high-velocity corrosive gas, it is preferable to use hafnia that does not contain a silica constituent, for example zirconia-containing hafnia or hafnia that does not contain impurities which has been stabilized by only the rare-earth oxide. On the other hand, at the region of the second layer which is in contact with the first layer, it is preferable to form the stabilized hafnia layer from hafnia stabilized only by silica or in some cases by silica having a large silica component and a rare-earth oxide. Since silica has a large thermal expansion coefficient, if a large amount of silica is present in the hafnon layer, a thermal expansion coefficient mismatch will develop between the substrate and the hafnon layer causing distortions to appear in the coating. Therefore, while ideally silica is not present in a first layer which is being directly coated on a substrate having a low thermal expansion coefficient, in practice hafnon (HfSiO$_4$) is used as a main constituent during the deposition process, whereby the composition comprises a hafnia-silica oxide layer. This is thought to be because during deposition silicon diffuses from the substrate, whereby the silicon phase develops in practice through such factors as the degradation of the hafnon phase Accordingly, if the portion of the second layer in contact with the first layer is made to be hafnia stabilized by silica, the mismatch in thermal expansion coefficient with the first layer decreases. More preferably, the ratio of the silica constituent in the second layer is made to decrease heading toward the coating surface, whereby there is no or hardly any silica constituent at the top-coat portion which forms the surface (refer to FIG. 2). In such a second layer composition, not only does the thermal expansion coefficient mismatch with the first layer decrease, but because the top-coat portion is formed only from hafnia stabilized by a rare-earth oxide, the second layer is stable against a high-temperature and high-velocity corrosive gas. Of course, this is not to reject stabilizing the hafnia in the second layer by a single constituent of either a rare-earth oxide or silica.

The hafnon thermal expansion coefficient of the bottom-most layer and the hafnia thermal expansion coefficient employed as the uppermost layer differ by a large margin, meaning that deposition is impossible under conventional methods. Even were deposition able to be carried out, a large thermal expansion coefficient mismatch between the hafnon and the hafnia would develop, leading to a risk of damage to the coating. It is therefore necessary to gradually alleviate the large thermal expansion coefficient mismatch between the hafnon and the hafnia of the uppermost layer. In the present embodiments the thermal expansion mismatch or the stress caused therefrom, is alleviated by grading the second layer silica constituent so that it gradually decreases from the first layer toward the coating surface.

Specifically, the gradient change of the composition of hafnia in the second layer is such that the silica constituent of the stabilizer is subject to gradient change in the thickness direction of the coating. The production method is not particularly restricted, although it is achieved so that the silica constituent used for hafnia stabilization within a single layer gradually decreases toward the coating surface side. Examples include continuously gradient-changing using a method such as degradation which exploits the thermal gradient of a deposited silica solid-solution or excess-silica hafnon layer, gradient-changing by successively depositing a number of layers so that the composition of the silica constituent decreases as a share of the stabilizer, CVD, PVD, particle array/spray method, centrifugal force method, plasma twin torch thermal spraying, SHS and the like. In the present specification the term "gradation of the composition" is used in a sense that encompasses both the case of a multi-layered coating such as that deposited with a number of layers, and the case in which the composition is made to gradually change at the atom level with a single-layer coating.

Here, stabilized hafnia may be comprised as a main constituent in the corrosion-resistant layer of hafnia stabilized by one or more rare-earth oxides and/or silica, and a small amount of one or more of $SiO_2$, $Ln_2Si_2O_7$, $Ln_2SiO_5$, $HfSiO_4$ and $ZrSiO_4$ phase may be comprised as a subphase depending on the type of hafnia stabilizer or the like added in response to coating non-uniformity. However, the manifestation of these subphases should be kept to the extent that does not impair the performance as an environmental barrier coating material, namely the corrosion-resistance and erosion-resistance against the high-temperature and high-velocity corrosive gas.

The environmental barrier coating structure of the above-described structure is provided by directly depositing on a substrate having a low thermal expansion coefficient a hafnon layer having a low thermal expansion coefficient of about the same magnitude as that of the substrate, and then forming thereon a hafnia layer that is stable over a long period of time in a high-velocity gas.

The intermediate layer hafnon can be deposited by sputtering, laser ablation, sol-gel, plasma spraying, dipping or several of these methods used in combination. Considering adhesion to the substrate, a gas phase method or solution method such as sputtering and sol gel, or plasma spraying could be considered as being superior, although because the melting point of hafnon is relatively low, a coating having extreme homogeneity and good adhesion can be achieved by setting the thermal treatment conditions to about 1400° C. for even a dipping method. Similarly, even for the corrosion-resistant layer deposition method, deposition can be carried out by sputtering, laser ablation, sol-gel, plasma spraying, dipping or several of these methods used in combination.

The corrosion-resistant layer may comprise stabilized hafnia as a main constituent, and a slight amount of $SiO_2$, $Ln_2Si_2O_7$, $Ln_2SiO_5$, $HfSiO_4$ and $ZrSiO_4$ phase as a subphase. Hafnia is stabilized as a high-temperature stabilized phase of a cubic system or a tetragonal system by one or more rare-earth oxides and silica. Although the thermal expansion coefficient of stabilized hafnia is larger than the thermal expansion coefficient of non-oxide ceramics, by comprising zirconia as a second layer, depositing a layer of hafnia stabilized by one or more rare-earth oxides and silica, and grading the silica constituent of the second layer so that it gradually decreases from the first layer heading toward the coating surface, hafnia stabilized by one or more rare-earth oxides and silica and hafnia stabilized by one or more rare-earth oxides are formed in order of smaller thermal expansion coefficients, whereby stress that develops in the surface layer can be alleviated. Here, if the hafnia is stabilized by one or more rare-earth oxides and silica, they can be selected as appropriate in the range of a solid-solution of rare-earth oxide and silica in hafnia, and can be, for example, preferably in the range by mole ratio of from about 9:1 to 6:4; preferably from 8:2 to 6:4; and more preferably from 7:3 to 6:4.

The gradient change of the hafnia composition in the second layer can be such that the gradient change is made to be continuous within a single layer, or the gradient change is made by successively depositing a number of layers which are different in their composition of the silica constituent as a share of the stabilizer. However, it is enough in the present invention for the composition to be graded in a thickness direction of the coating. A number of methods can be thought of for changing the gradation of the silica constituent within a single layer, and thus the production method is not restricted. Examples include depositing several layers having a different silica constituent content, and degradation by exploiting the thermal gradient of a deposited silica solid-solution or excess-silica hafnon layer.

When a non-oxide ceramics is employed as a gas turbine component, it is necessary to suppress erosion for over 8,000 hours or even more (10,000 hours or more). Therefore, for a heat-resistant coating (generally referred to as "TBC") in a gas turbine that is exposed to a high-velocity gas flow which contains water vapor at very high-temperature (for example 1300° C.), it is desirable for the coating to be as thick as possible. While the thickness of the corrosion-resistant layer is set according to the operating environment in an actual machine and the corrosion-resistance of the material, considering the case of erosion in an actual machine environment exposed to a high-velocity gas flow which contains water vapor at a high-temperature of 1300° C. or more, the thickness should be set to be at least about 200 µm, preferably a thickness exceeding about 300 µm and more preferably a thickness of about 600 µm that is not subject to any production difficulties.

It should be noted that the above-described embodiment, while being one preferred example according to the present invention, is not meant to be limiting thereto, and various changes are possible without departing from the scope of the present invention. For example, while the present embodiment was mainly described giving an example as a substrate used for the covering of a high-temperature gas turbine blade made from non-oxide ceramics such as silicon nitride, silicon carbide or a composite material thereof, this coating structure can be applied to other substrates having a low thermal expansion coefficient and is effective as an environmental barrier coating. The present invention can be applied oxide ceramics, metals, any substrate as long as it has a low thermal expansion coefficient. In addition, the entire structure can be made so as to not break even if cracks develop by increasing the porosity of the layer in which hafnia has been made as the main constituent, for example to about 50%.

While the present embodiment has mainly described the hafnia constituting the second layer by using an example in which the zirconia content is fixed, the present invention is not restricted thereto, wherein two or more differing content ratios may be employed such as by grading the silica constituent in the second layer as well, or just the zirconia by itself. In such a case, because the thermal coefficient of zirconia is larger than the thermal coefficient of hafnia, the zirconia content in the second layer must be made higher in the region close to the coating surface than the region in contact with the first layer. That is, in the environmental barrier coating structure according to the present invention, the zirconia content in the portion toward the second layer, which is the corrosion-resistant layer, is preferably higher than that in the portion toward the first layer. More preferable is if the zirconia content ratio is graded in a way so that it increases heading away from the first layer. In such a case the change in thermal expansion coefficient in the second layer is more moderate, thereby suppressing crack development. Gradation and stepped change of the zirconia constituent can be easily achieved by gradually increasing the zirconia content ratio heading toward the coating surface (refer to FIG. 2), or depositing with a plurality of layers so that the upper layers (coating surface side) have a higher zirconia content ratio than the bottom layers.

Thus, when the mixture consisting of a hafnia constituent and a zirconia constituent is more zirconia-rich the closer it is to the coating surface has the advantage that environmental resistance does not deteriorate while using a cheaper raw material. That is, since hafnium and zirconium belong to the same group in the periodic table, their nature is extremely similar, and zirconia itself possesses excellent environmental resistance. Accordingly, no dramatic deterioration in environmental resistance, such as erosion resistance, is caused, and to the contrary is preferable in terms of reducing costs since hafnia having a large amount of zirconia as impurities, or that wherein the zirconia content is deliberately increased to reduce the size of the region (thickness) in which hafnia is present can be achieved. It is also possible to intentionally add a larger amount of zirconia than which is in poor purity hafnia (a zirconia content of about 10%) as long as the zirconia content in the hafnia does not reach 100%.

EXAMPLES

Examples according to the present invention shall now be explained based on FIGS. 1 to 6.

In the following, a water vapor corrosion test was performed on hafnia and zirconia-containing hafnia in an environment of 1500° C., whereby it was demonstrated that the effects of water vapor on corrosion and the effects of alkali constituent on corrosion were superior to those of other materials. In addition, it was also demonstrated that the corrosion-resistance of hafnia and zirconia-containing hafnia was superior to that of a rare-earth silicate even in a high-velocity gas flow equivalent to an actual gas turbine conditions.

FIG. 1 illustrates a cross-sectional view of the multi-layered coating ceramics according to the present invention. A first layer in contact with a substrate 1 is a layer having hafnon as a main constituent, which was deposited by dipping. A second layer 3 has formed therein from a position close to the substrate 1 as shown in the figure a hafnia layer stabilized by one or more rare-earth oxides and silica and a hafnia layer stabilized by one or more rare-earth oxides as respective structural phases. A graded intermediate layer is formed in between these layers from a composition in which the silica constituent gradually decreases from the portion closest to the first layer so that no silica is contained at the coating surface portion (refer to FIG. 2). Although the respective thermal expansion coefficients of the hafnia layer stabilized by one or more rare-earth oxides and silica and the hafnia layer stabilized by one or more rare-earth oxides differ, as a result of the silica constituent gradient the thermal expansion coefficient increases going gradually from close to the substrate.

First, using a commercially available silicon nitride ceramics (silicon nitride manufactured by Kyocera Corporation; Product name: SN282) as the substrate 1, a first layer 2 having a main constituent of hafnon was directly deposited onto the substrate, then a second layer 3 was formed on the first layer by depositing zirconia-containing hafnia stabilized by silica and one or more rare-earth oxides graded in a such a way that the silica constituent gradually decreased heading away from the first layer 2.

Figure 3:
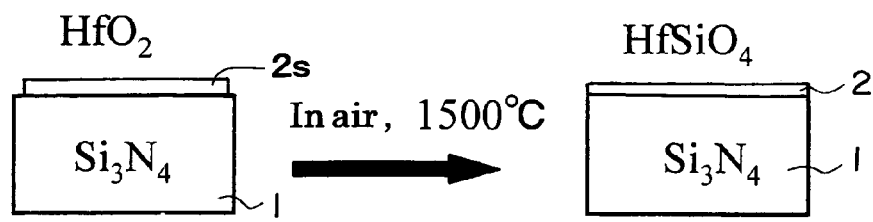
FIG. 3 is an explanatory diagram illustrating the coating method for a silicon nitride ceramics covered with an environmental barrier coating, which shows the deposition method for the first layer and the deposition method for the second layer.
Figure 3:
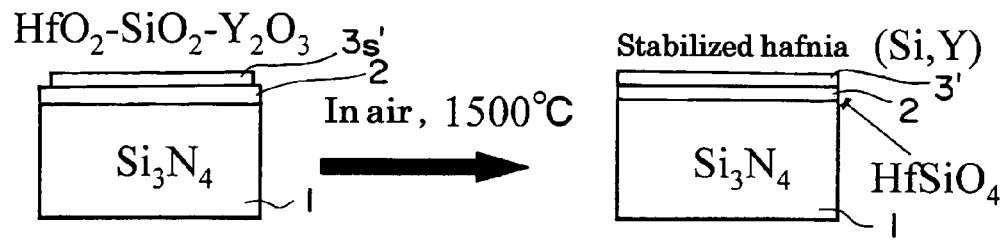
Figure 3:
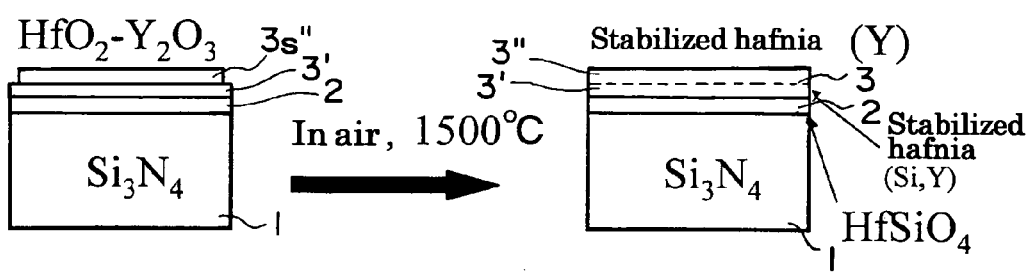

FIG. 3 illustrates the production method for a silicon nitride ceramics coated with multi-layers (hafnon)—(hafnia stabilized by yttria and silica)—(hafnia stabilized by yttria) prepared in this Example. A slurry 2s of 99.99% pure hafnia (98% hafnia, 1.9% zirconia) and containing 1 wt. % PVA binder was coated by dipping onto a substrate 1 of a silicon nitride ceramics, and thermally treated in air at 1500° C. for 12 hours (refer to FIG. 3). This caused the silicon nitride ceramics to oxidize, whereby the formed silica and the hafnia coated on the substrate reacted according to the below-described chemical reaction formula to give hafnon, which allowed a hafnon layer 2 serving as an intermediate layer to be deposited on the substrate 1 of the silicon nitride ceramics.

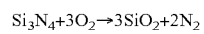

$Si_3N_4 + 3O_2 \rightarrow 3SiO_2 + 2N_2$

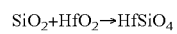

$SiO_2 + HfO_2 \rightarrow HfSiO_4$

Subsequently, a second layer 3 having silica as a main constituent was formed on the first layer 2. In the present Example, hafnia stabilized by yttria and silica was first deposited, on top of which was further deposited hafnia stabilized by yttria, thereby forming a second layer 3 in which the silica constituent was graded. The method for making the second layer multi-layered is not restricted, wherein the gradient change of the silica constituent can be achieved by not only gradually changing the composition at the atom level in a single layer coating by CVD or the like, but also can be achieved by depositing a number of layers that differ in their silica constituent composition ratio.

In the present Example, a graded second layer 3 was formed from a multi-layered coating. First, hafnia 3' stabilized by yttria and silica was deposited on top of a hafnon layer 2 (first layer). The mole ratio of yttria ($Y_2O_3$) to silica ($SiO_2$) in this was made to be 1:2. A slurry 3s' consisting of this mixture ratio of yttria and silica with hafnia in a mole ratio of 2:8 was coated onto the hafnon layer 2 by dipping. This layer was then thermally treated in air at 1500° C. for 12 hours, which caused the hafnia, silica and yttria to react according to the below-described chemical reaction formula to form a yttria-silica stabilized hafnia layer 3'.

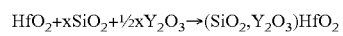

$HfO_2 + xSiO_2 + \frac{1}{2}xY_2O_3 \rightarrow (SiO_2, Y_2O_3)HfO_2$

In addition, a slurry 3s'' consisting of yttria and hafnia in a mole ratio of 2:8 was coated onto the yttria-silica stabilized hafnia layer 3' by dipping, and thermally treated in air at 1500° C. for 12 hours, which caused the hafnia, silica and yttria to react according to the below-described chemical reaction formula to form a yttria stabilized. hafnia layer 3''. At this time, the previously-formed yttria-silica stabilized hafnia layer 3' surface-side (the surface away from the first layer 2) constituent was degraded according to its thermal gradient thereby forming a gradient in the silica constituent. Although in the present Example both the first layer and the second layer were formed by a dipping method as the coating preparation technique, other methods are also possible, such as sputtering, laser ablation, sol-gel, plasma spraying, or several of these methods taken in combination.

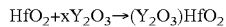

$$HfO_2 + xY_2O_3 \rightarrow (Y_2O_3)HfO_2$$

Figure 4A:
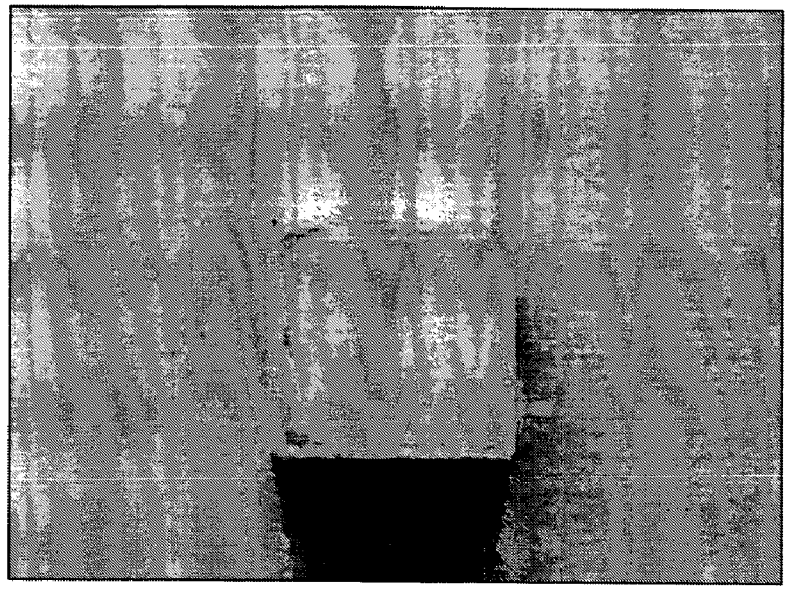
FIGS. 4A and 4B are a diagram illustrating the external appearance of a silicon nitride ceramics obtained by the method according to FIG. 3, wherein FIG. 4A denotes hafnon and FIG. 4B denotes a silicon nitride ceramics having a layer of yttria-silica further deposited thereon.
Figure 4B:
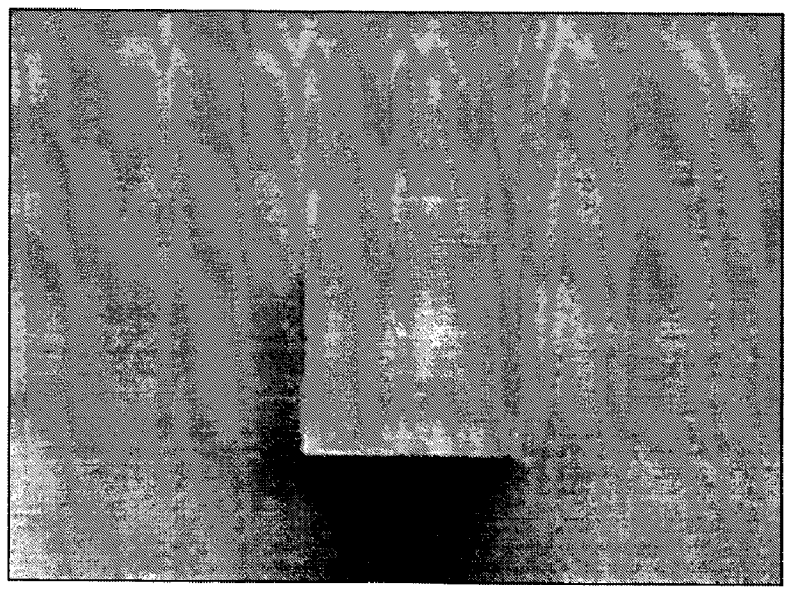

FIGS. 4A and 4B are a photograph of the external appearance of a silicon nitride ceramics FIG. 4A formed having a hafnon layer, and a silicon nitride ceramics FIG. 4B further formed thereon having a yttria-silica stabilized hafnia layer. A good coating was produced, in which no prominent cracks were apparent from visual observation. The results of phase identity from X-ray diffraction confirmed that the respective hafnon and stabilized hafnia phases were present.

A desired multi-layer coated silicon nitride ceramics was produced using the above-described method. As illustrated in FIGS. 4A and 4B, a coating was produced in line with the original purpose, in which no prominent cracks were formed, and the stress caused in the coating as a result of thermal expansion coefficient mismatch had been alleviated.

Next, results demonstrating that hafnia and zirconia show excellent corrosion-resistance in a static water vapor corrosion environment will be explained. The test was carried out using a mixture of hafnia and zirconia. The sample used in this test had a hafnia:zirconia=98:1.9 composition. The pellet bulk had a density of 4.52 g/cm³, which was 73% of the theoretical density.

The corrosion test was performed under the following conditions. In consideration of the environment in an actual gas turbine conditions, temperature was set at 1500° C. Since the purpose was to understand corrosion behavior, the time was set to 50 hours. The rate of raising and lowering the temperature was 250° C./hour. The atmosphere was made to have a 30% weight fraction of water vapor weight with respect to air. In an actual gas turbine conditions, water vapor is formed from the combustion of fossil fuels, and is roughly 10 wt. %, although the test conditions in the present example had a higher water vapor amount. That is, harsh test conditions were selected. The flow amount was 175 ml/min, which was charged into an alumina tube having a 90 mm inner diameter. Compared with the air flow in an actual gas turbine conditions, this air flow was so low that it can be ignored, thus making the present test equivalent to a static state water vapor test. Many oxides corrode under static conditions even at the relatively low temperature of 500° C. Thus, for the purpose of eliminating the effects of corrosion forming at such a low temperature, and to correctly grasp the effects of corrosion at high temperatures, once the temperature had reached 1500° C. water vapor was introduced, and this introduction was stopped at the stage where 50 hours had passed.

Figure 5A:
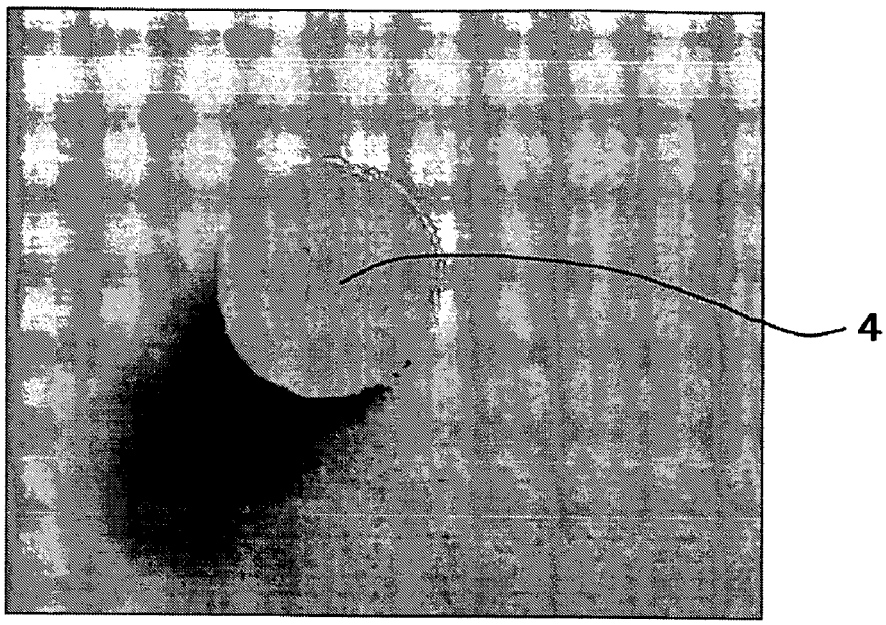
Figure 5B:
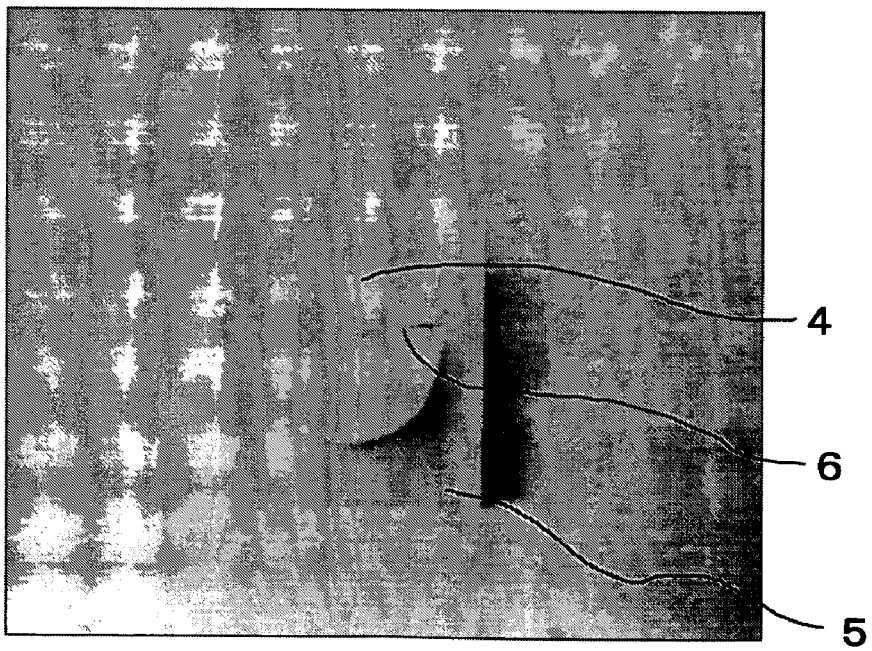

FIGS. 5A and 5B illustrate the external appearance of a pre-test sample FIG. 5A and a post-test sample FIG. 5B. The sample 4 used in this instance was a mixture of non-stabilized hafnia and non-stabilized zirconia. Since non-stabilized zirconia undergoes a phase transformation in the vicinity of 1000° C. as a result of volumetric expansion, a crack 6 formed due to thermal history. Since the phase transformation temperature of hafnia is 1700° C., the crack 6 shown in FIG. 5B can be considered as being caused by the zirconia transformation. Since hafnia and zirconia do not exhibit phase transformation up to a high temperature, no cracks formed and a phase transformation and weight decrease due to the water vapor were not found.

The corrosion test was performed by placing a tested sample on an alumina plate 5 as shown in FIG. 5B. This alumina did not contain more than a 1% alkali constituent. It is known that the presence of an alkali usually accelerates corrosion; however in the present test no change in the sample was found even on the sample underside in contact with the alumina. Therefore, it was proved that the present sample, namely the mixture of hafnia and zirconia, was stable under static state water vapor test conditions.

Figure 6:
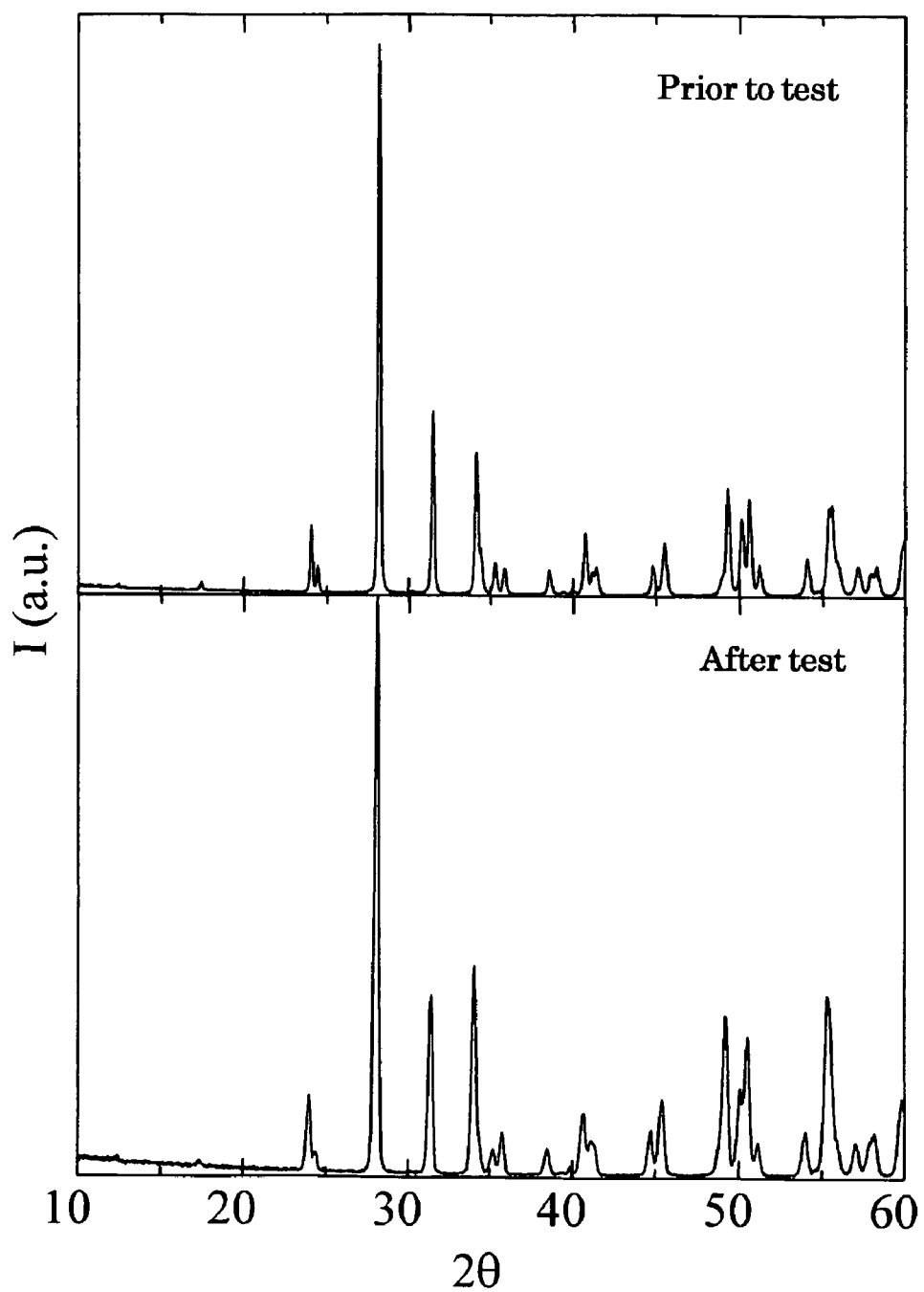
FIG. 6 is an X-ray diffraction pattern obtained from the sample surface before and after the corrosion test.

FIG. 6 illustrates an X-ray diffraction pattern obtained from the sample surface before and after the corrosion test. No phases were found to have been newly formed after the corrosion test. From the fact that the X-ray diffraction pattern obtained from the sample surface after the test was identical to the post-test pattern of FIG. 6, it can be easily surmised that even if this sample contained a small amount of alkali constituent, corrosion was not accelerated due to the presence of the alkali constituent.

Next, a test in an environment equivalent to that in an actual gas turbine conditions will be explained. The test was carried out using a mixture of hafnia and zirconia. The ratio of hafnia:zirconia was 98:1.9. To compare the erosion process for this mixture with that of the other samples, the test was carried out under the same conditions on the $Lu_2Si_2O_7$ phase, which is said to have excellent resistance to water vapor corrosion. The test conditions were: gas temperature 1500° C.; pressure 0.29 MPa; and water vapor partial pressure 30 kPa. The gas flow rate was set to simulate the same flow rate in an actual turbine condition of 150 m/s. Time was set at 10 hours.

The results of the test were that the erosion rate of the $Lu_2Si_2O_7$ phase was in the order of $10^{-5}$ g/cm²×h. Further, the erosion rate for the hafnia was within the margin of measurement error, and so no erosion was observed. This fact proved that the hafnia-zirconia mixture was not corroded in a high-temperature and high-velocity air flow equivalent to that in an actual gas turbine conditions even in an environment in which water vapor was present and could therefore suppress erosion over a long period of time.

Accordingly, it was proved that the ceramics covered with the environmental barrier coating according to the present invention illustrated in FIG. 1 can suppress erosion over a long period of time in a high-temperature and high-pressure air flow, even in a gas turbine combustion location in which water vapor is present.

INDUSTRIAL APPLICABILITY

The environmental barrier coating material, as well as the coating structure in which the coating material is applied, according to the present invention is suitable for use in a harsh environment which is exposed to a high-temperature high-velocity gas flow containing water vapor, and is effective as an environmental barrier coating material for suppressing corrosion and erosion in an environment in which a corrosive gas is present under the high-temperature and high-pressure of a gas turbine component having a substrate such as silicon nitride or silicon carbide which have a low thermal expansion coefficients.

Figure 2:
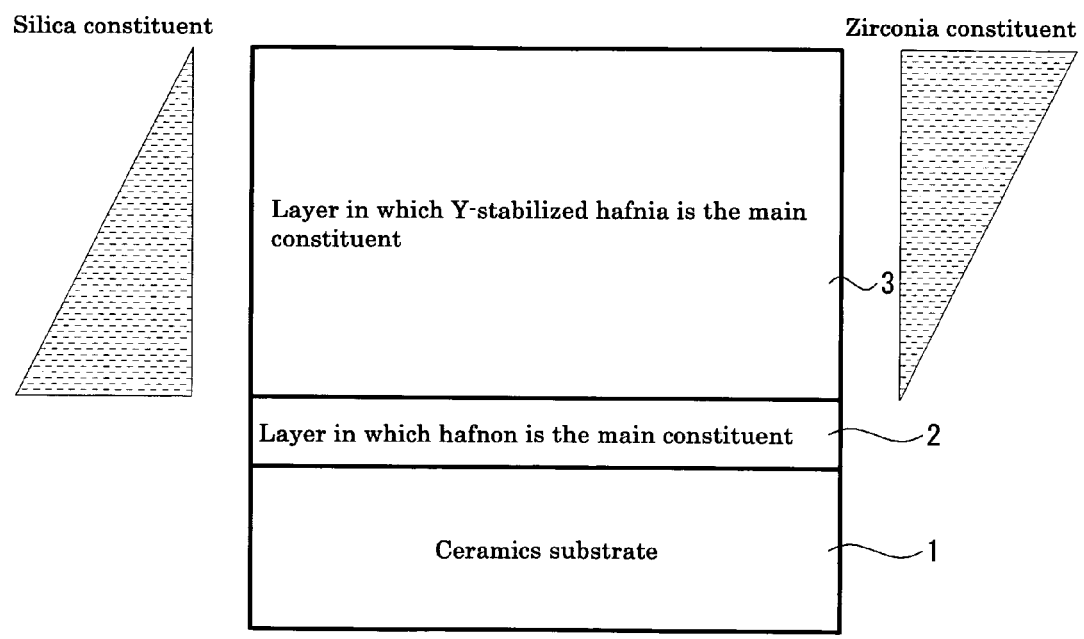
FIG. 2 shows a diagram illustrating an image of the gradation of the second layer composition of the environmental barrier coating.

FIG. 1
Composition is graded
Layer in which Y-stabilized hafnia is the main constituent
Layer in which hafnon is the main constituent
Ceramics substrate From 1 to 600 micron
From 0.1 to 600 micron FIG. 2
Silica constituent
Layer in which Y-stabilized hafnia is the main constituent
Layer in which hafnon is the main constituent
Ceramics substrate
Zirconia constituent FIG. 3
Deposition method for the first layer
In air
Deposition method for the second layer
Stabilized hafnia FIG. 6
Prior to test
After test

What is claimed is:

1. An environmental barrier coating material comprising zirconia-containing hafnia stabilized by silica, and one or more rare-earth oxides, wherein
the silica content in the coating material gradually decreases toward the surface of the coating material; and
the zirconia content in the coating material gradually increases toward the surface of the coating material.

2. The environmental barrier coating material of claim 1, wherein the surface of the coating material does not contain any silica.

3. An environmental barrier coating structure for covering a substrate that has a low thermal expansion coefficient, comprising hafnon ($HfSiO_4$) serving as a first layer directly formed on the substrate, and hafnia with which the first layer is coated as a second layer.

4. The environmental barrier coating structure according to claim 3, wherein the hafnia contains zirconia ($ZrO_2$).

5. The environmental barrier coating structure according to claim 4, wherein in the second layer the zirconia content is higher in a portion near a coating surface than a portion near the first layer.

6. The environmental barrier coating structure according to claim 5, wherein in the second layer the zirconia content gradually increases as receding from a portion facing the first layer.

7. The environmental barrier coating structure according to claim 3, wherein the hafnia is stabilized.

8. The environmental barrier coating structure according to claim 7, wherein stabilization of the hafnia is performed by one or more constituents selected from a group consisting of rare-earth oxides and silica.

9. The environmental barrier coating structure according to claim 8, wherein a layer of hafnia which contains zirconia and is stabilized by one or more rare-earth oxides and silica is formed as the second layer, and the silica constituent of the second layer has a gradient in content so as to gradually decrease from a portion facing the first layer toward the coating surface.

10. The environmental barrier coating structure according to claim 9, wherein in the second layer a portion closest to the first layer comprises hafnia stabilized by only silica and a coating surface portion comprises hafnia stabilized by only one or more rare-earth oxides.

11. The environmental barrier coating structure according to claim 8, wherein the rare-earth oxide comprises one or more hafnia stabilizers selected from a group consisting of $Y_2O_3$, $La_2O_3$, $Nd_2O_3$, $Sm_2O_3$, $Gd_2O_3$, $Dy_2O_3$ $Ho_2O_3$, $Er_2O_3$, $Yb_2O_3$ and $Lu_2O_3$.

12. The environmental barrier coating structure according to claim 7, wherein the stabilized hafnia layer as the second layer comprises a small amount of one or more of $SiO_2$, $Ln_2Si_2O_7$ (Ln representing a rare-earth), $Ln_2SiO_5$, $HfSiO_4$ and $ZrSiO_4$ phases as a subphase.

13. The environmental barrier coating structure according to claim 12, wherein a thickness of the stabilized hafnia layer is from 1 μm to 600 μm.

14. The environmental barrier coating structure according to claim 7, wherein the stabilized hafnia is stabilized in a cubic system or a tetragonal system by one or more rare-earth oxides and has a mole ratio with respect to hafnia of $AO_2$ (A representing hafnia):$Ln_2O_3$ (Ln representing a rare-earth) in a range from about 97:3 to 50:50.

15. The environmental barrier coating structure according to claim 7, wherein the stabilized hafnia is stabilized in a cubic system or a tetragonal system by one or more rare-earth oxides and silica, and has a mole ratio $AO_2$:$Ln_2O_3$ and $SiO_2$ in a range from about 9:1 to 6:4.

16. The environmental barrier coating structure according to claim 3, wherein the first layer is a hafnia-silica oxide layer comprising hafnon ($HfSiO_4$) as a main constituent and at least one of hafnia ($HfO_2$), zirconia ($ZrO_2$) or silica ($SiO_2$).

17. The environmental barrier coating structure according to claim 16, wherein the hafnia-silica oxide layer as the first layer has a hafnium and silicon composition ratio by atomic ratio in a range from about 3:7 to 7:3.

18. The environmental barrier coating structure according to claim 17, wherein a thickness of the hafnia-silica oxide layer is from 0.1 μm to 600 μm.

19. The environmental barrier coating structure according to claim 3, wherein the substrate is formed of silicon nitride ceramics, silicon carbide ceramics or a composite material thereof.

* * * * *

UNITED STATES PATENT AND TRADEMARK OFFICE
CERTIFICATE OF CORRECTION

PATENT NO. : 7,138,183 B2
APPLICATION NO. : 11/034140
DATED : November 21, 2006
INVENTOR(S) : Hisamatsu et al.

It is certified that error appears in the above-identified patent and that said Letters Patent is hereby corrected as shown below:

Column 16, line 14, should read
-- $Y_2O_3, La_2O_3, Nd_2O_3, Sm_2O_3, Gd_2O_3, Dy_2O_3, Ho_2O_3, Er_2O_3,$ --

Signed and Sealed this

Tenth Day of April, 2007

JON W. DUDAS
*Director of the United States Patent and Trademark Office*